United States Patent [19]
Shellabarger

[11] Patent Number: 5,632,506
[45] Date of Patent: May 27, 1997

[54] VEHICLE OCCUPANT PROTECTION APPARATUS

[75] Inventor: Richard E. Shellabarger, Sterling Heights, Mich.

[73] Assignee: TRW Vehicle Safety Systems Inc., Lyndhurst, Ohio

[21] Appl. No.: 663,627

[22] Filed: Jun. 14, 1996

[51] Int. Cl.⁶ ................................................. B60R 21/20
[52] U.S. Cl. .................... 280/743.1; 280/732; 280/728.1
[58] Field of Search ................................. 280/743.1, 729, 280/728.2, 732, 728.1

[56] References Cited

U.S. PATENT DOCUMENTS

| | | | |
|---|---|---|---|
| 3,792,873 | 2/1974 | Buchner et al. | 280/743.1 |
| 3,799,575 | 3/1974 | Kurze et al. | 280/743.1 |
| 4,153,273 | 5/1979 | Risko | 280/740 |
| 4,169,613 | 10/1979 | Barnett | 280/732 |
| 4,262,931 | 4/1981 | Strasser et al. | 280/729 |
| 4,286,954 | 9/1981 | McArthur et al. | 280/743.1 |
| 4,944,527 | 7/1990 | Bishop et al. | 280/743.1 |
| 4,964,654 | 10/1990 | Bishop et al. | 280/743.1 |
| 5,022,675 | 6/1991 | Zelenak, Jr. et al. | 280/743.1 |
| 5,149,130 | 9/1992 | Wooley et al. | 280/743.1 |
| 5,172,933 | 12/1992 | Strasser | 280/740 |
| 5,498,030 | 3/1996 | Hill et al. | 280/743.1 |
| 5,529,340 | 6/1996 | Fairbanks | 280/743.1 |
| 5,566,972 | 10/1996 | Yoshida et al. | 280/728.2 |

FOREIGN PATENT DOCUMENTS 4137691  11/1992  Germany ............... 280/743.1

*Primary Examiner*—Christopher P. Ellis
*Attorney, Agent, or Firm*—Tarolli, Sundheim, Covell, Tummino & Szabo

[57] ABSTRACT

An air bag module (14) includes an air bag (12) and an inflator structure (20) with a mounting stud (32). The air bag (12) has a compartment (63) for the inflator structure (20), and has a wrapped condition in which it retains the inflator structure (20) within the compartment (63). The air bag (12) includes first and second panels (72,74). An aperture (94) formed in the first panel (72) communicates with the compartment (63). The first panel (72) is fixed to the second panel (74) at a seam (134) located between the aperture (94) and an end (66) of the first panel (72). Another aperture (88) extends through the first panel (72) at a location between the seam (134) and the end (66) of the first panel (72). The apertures (94, 88) are aligned to receive the mounting stud (32) on the inflator structure (20) when the air bag (12) is in the wrapped condition.

27 Claims, 4 Drawing Sheets

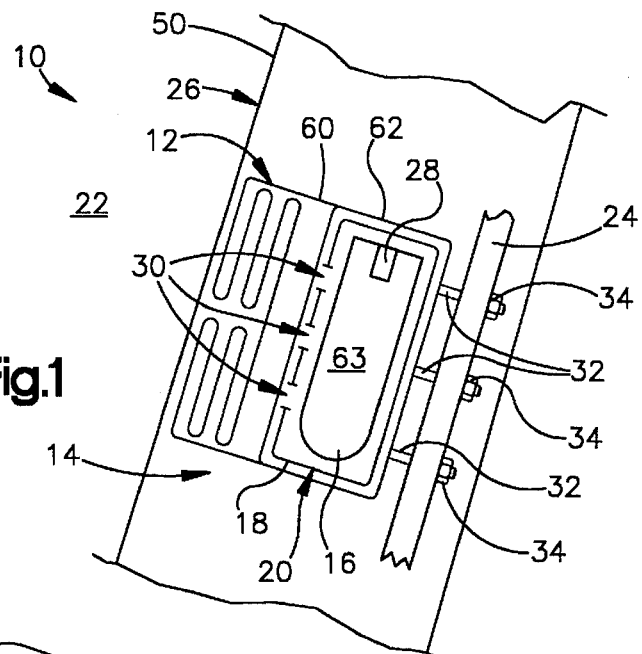
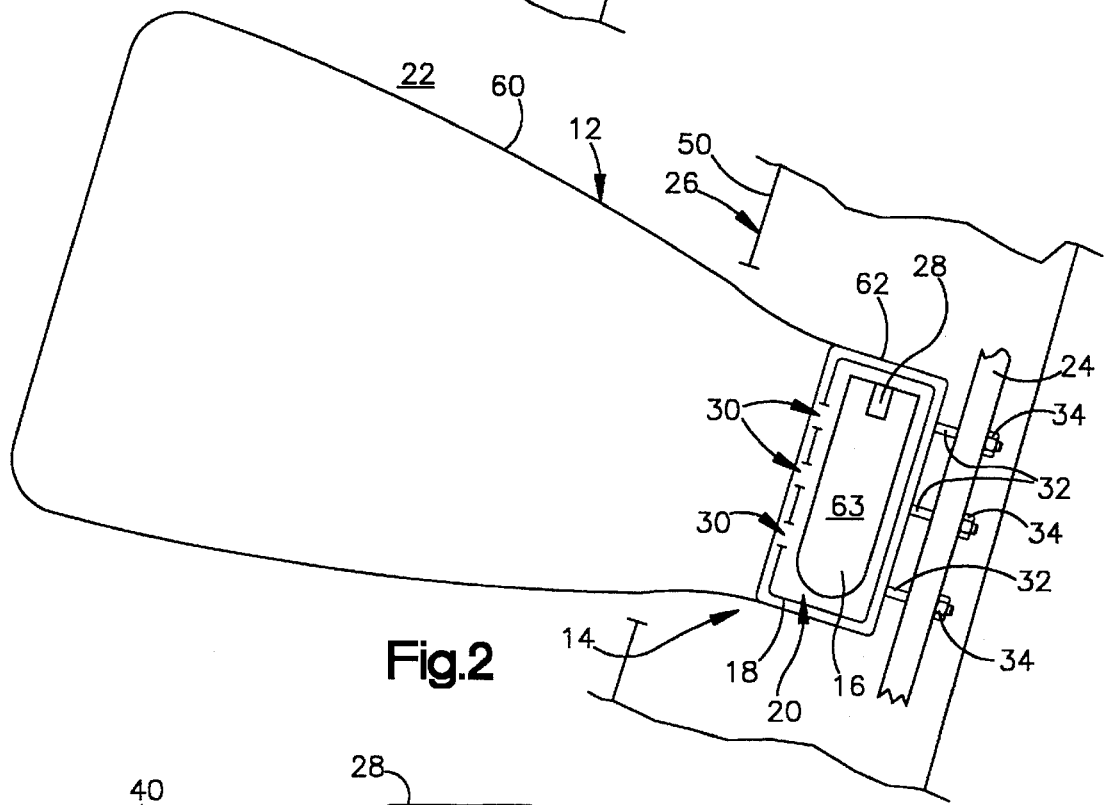
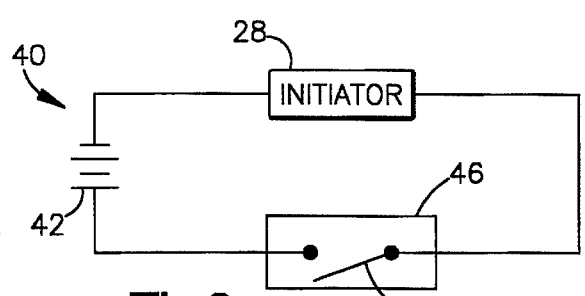

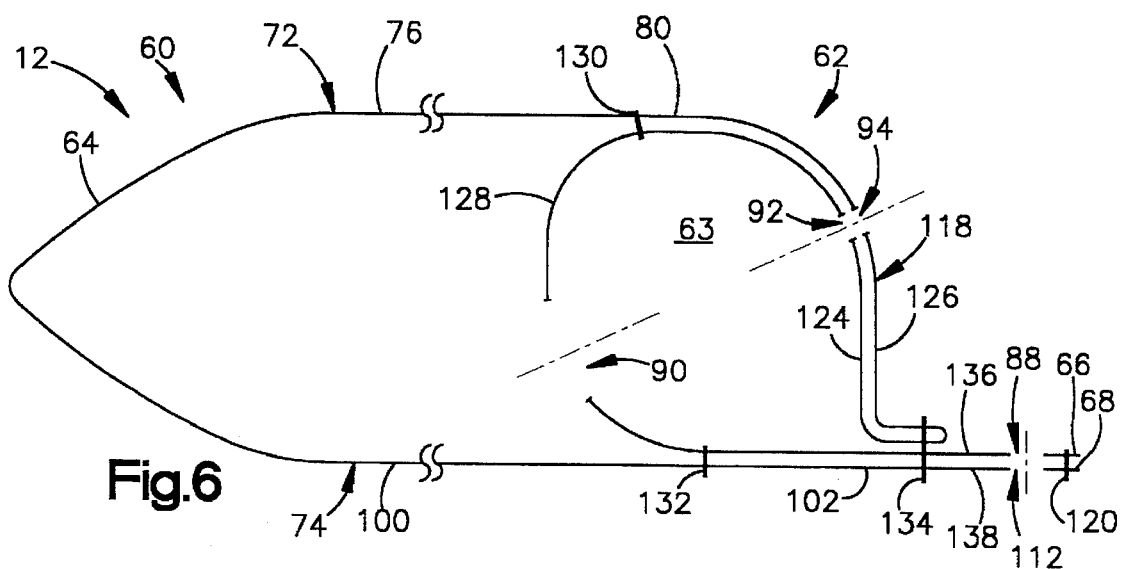
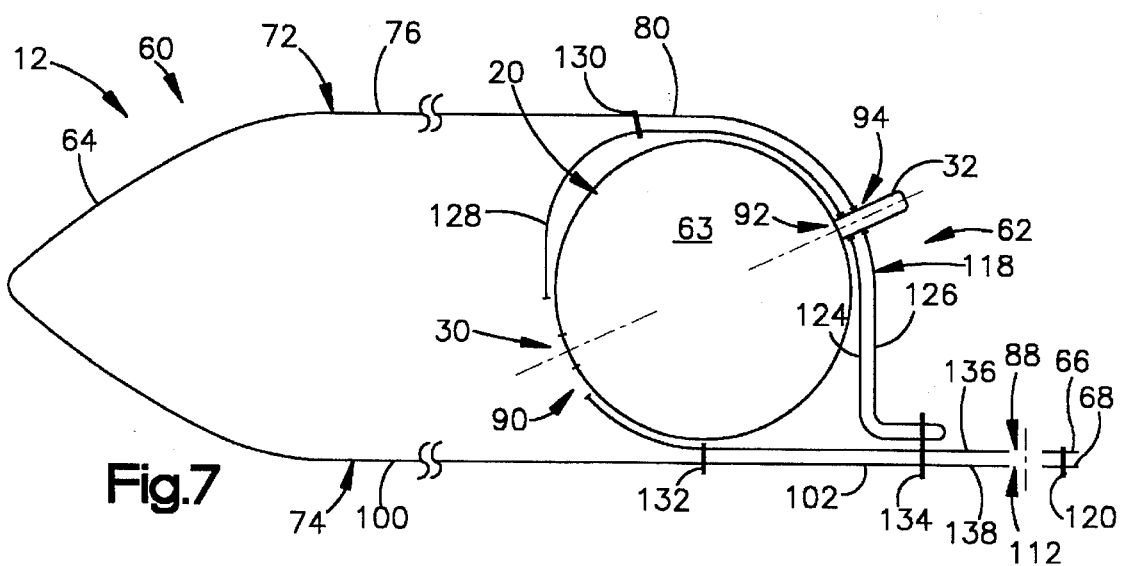
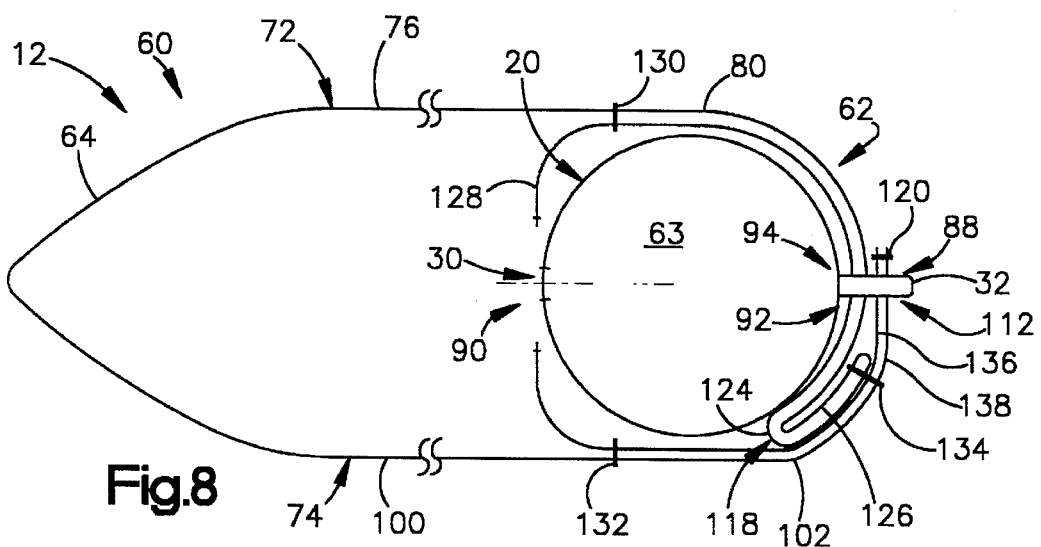

20

VEHICLE OCCUPANT PROTECTION APPARATUS

FIELD OF THE INVENTION

The present invention relates to an inflatable vehicle occupant protection device, and also relates to an inflator structure comprising a source of inflation fluid for inflating the protection device.

BACKGROUND OF THE INVENTION

An inflatable vehicle occupant protection device, such as an air bag, is part of an apparatus which further includes a collision sensor and an inflator. When the collision sensor senses a vehicle collision having at least a predetermined threshold level of severity, the inflator is actuated. The inflator then emits inflation fluid which inflates the air bag into the vehicle occupant compartment to help protect an occupant of the vehicle.

An air bag and an inflator are typically assembled together as parts of an air bag module which is separate from the collision sensor. The air bag module is located in the vehicle adjacent to the vehicle occupant compartment. For example, an air bag module may be located on the vehicle steering column or in the vehicle instrument panel. An air bag module may also be located in a side portion of the vehicle, such as a door panel, or in another part of the vehicle, such as the roof, the floor, or a seat.

An inflator in an air bag module commonly has an elongated cylindrical shape. An air bag module including such an inflator may also include an elongated, tubular diffuser which contains the inflator. The diffuser typically has a row of radially projecting mounting studs for mounting the air bag module in the vehicle. When the air bag module is assembled and installed in the vehicle, the diffuser and the inflator are contained together within an inlet portion of the air bag. The mounting studs project outward through a corresponding row of apertures in the inlet portion of the air bag.

When the inflator is actuated, the diffuser directs the inflation fluid to flow from the inlet portion of the air bag to a larger, inflatable body portion of the air bag. The inflation fluid inflates the body portion of the air bag into the vehicle occupant compartment to help protect an occupant of the vehicle.

SUMMARY OF THE INVENTION

In accordance with a principal feature of the present invention, an apparatus comprises an inflator structure with a mounting stud. The apparatus further comprises an inflatable vehicle occupant protection device with a panel structure. The panel structure defines a compartment for the inflator structure, and has a wrapped condition in which it retains the inflator structure in the compartment.

The panel structure includes first and second panels. A first aperture formed in the first panel communicates with the compartment. The first panel is fixed to the second panel at a seam located between the first aperture and an end of the first panel. A second aperture extends through the first panel at a location between the seam and the end of the first panel. The first and second apertures are aligned to receive the mounting stud on the inflator structure when the panel structure is in the wrapped condition.

In accordance with another principal feature of the present invention, the panel structure includes an inlet portion of the protection device, and further includes an inflatable body portion of the protection device. The inlet portion defines the compartment for the inflator structure. The body portion is inflatable into a vehicle occupant compartment. The protection device further has seams that maintain a part of the first panel in a loop-shaped configuration extending completely around the compartment. That part of the first panel has an inflation fluid outlet opening communicating the compartment with the body portion of the protection device.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of an apparatus including an air bag module comprising a preferred embodiment of the present invention;

FIG. 2 is a view showing the air bag module of FIG. 1 in an actuated condition;

FIG. 3 is a schematic view of an electrical circuit including a part of the air bag module of FIG. 1;

FIG. 6 is a schematic sectional view showing the air bag in a fully constructed condition;

FIG. 7 is a view similar to FIG. 6 showing an inflator structure contained within the air bag; and FIG. 8 is a view similar to FIG. 7 showing the air bag wrapped around the inflator structure.

DESCRIPTION OF A PREFERRED EMBODIMENT

Figure 4:
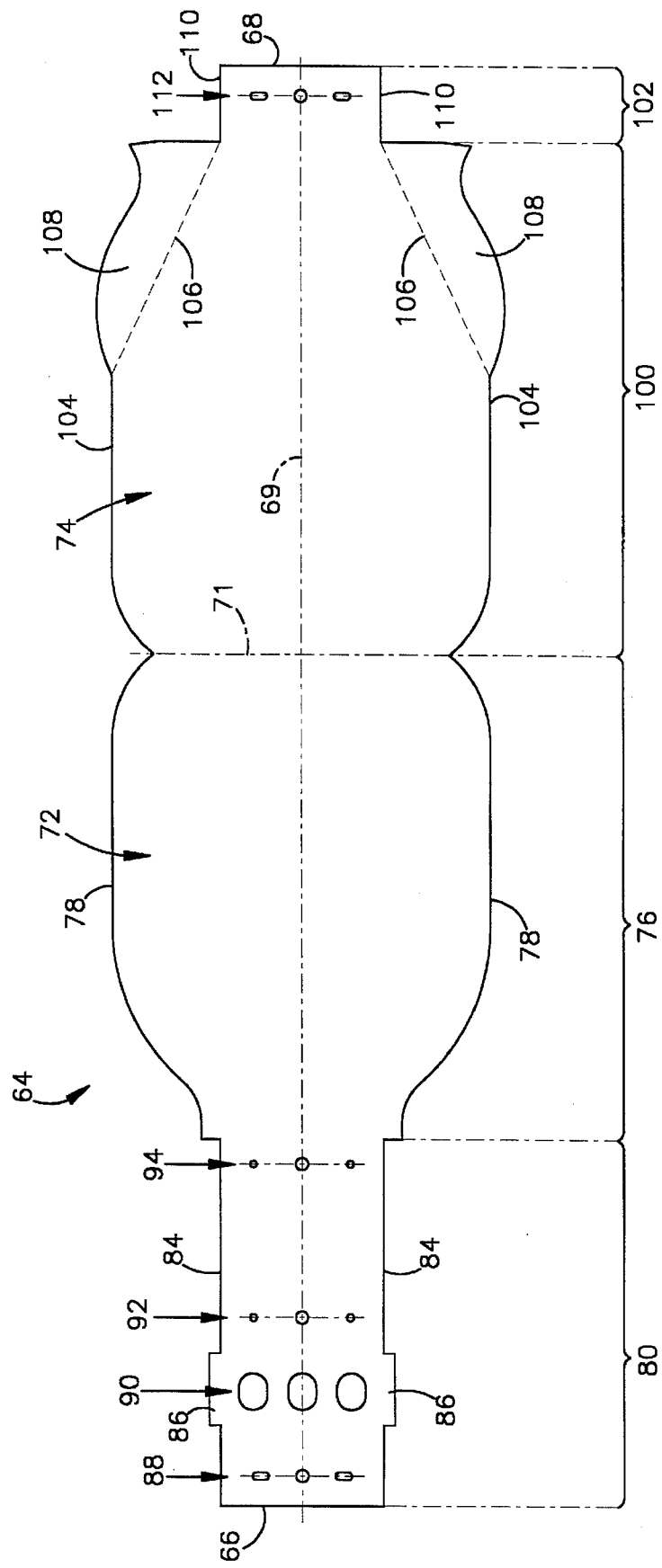
FIG. 4 is a plan view of a piece of material used to construct an air bag included in the air bag module of FIG. 1.

An apparatus 10 comprising a preferred embodiment of the present invention is shown schematically in FIGS. 1 and 2. The apparatus 10 includes a particular type of inflatable vehicle occupant protection device 12 which is commonly referred to as an air bag. The air bag 12 is inflatable from a folded, uninflated condition, as shown in FIG. 1, to an unfolded, inflated condition, as shown in FIG. 2. Other inflatable vehicle occupant protection devices that can be used in accordance with the present invention included inflatable seat belts, inflatable knee bolsters, inflatable head liners, and knee bolsters operated by inflatable air bags.

The air bag 12 is part of an air bag module 14. Other parts of the module 14 include an inflator 16 and a diffuser 18. The inflator 16 and the diffuser 18 together define an inflator structure 20 which is located inside the air bag 12. The module 14 is designed for installation in a vehicle at a location adjacent to the vehicle occupant compartment 22. As shown by way of example in FIGS. 1 and 2, the module 14 is mounted on an upper frame portion 24 of a vehicle seat 26.

The inflator 16 contains a source of inflation fluid for inflating the air bag 12. As known in the art, the inflator 16 may contain an ignitable gas generating material for generating a large volume of inflation gas. The inflator 16 may alternatively contain a stored quantity of pressurized inflation fluid, or a combination of pressurized inflation fluid and ignitable material for heating the inflation fluid. As shown in FIGS. 1 and 2, the inflator 16 has a elongated cylindrical shape. An electrical initiator 28 is located at one end of the inflator 16.

The diffuser 18 is an elongated, generally tubular part which contains the inflator 16 in a known manner. A plurality of inflation fluid outlet openings 30 extend through the diffuser 18. A plurality of mounting studs 32 project from the diffuser 18. In the preferred embodiment of the present invention shown in the drawings, there are three of the mounting studs 32 in a row extending along the diffuser 18 at a location opposite the outlet openings 30. Each mounting stud 32 is threaded, and receives a corresponding nut 34 for fastening the module 14 to the upper frame portion 24 of the vehicle seat 26.

As shown in FIG. 3, the initiator 28 is connected in a electrical circuit 40 with a power source 42 and a normally open switch 44. The power source 42 is preferably the vehicle battery and/or a capacitor. The switch 44 is part of a sensor 46 which senses a condition indicating the occurrence of a vehicle collision. In the preferred embodiment of the present invention, the sensor 46 senses a condition indicating the occurrence of a side-impact vehicle collision. Such a collision-indicating condition may comprise, for example, sudden transverse vehicle acceleration and/or crushing of a side portion of the vehicle. If the collision-indicating condition is at or above a predetermined threshold level, it indicates the occurrence of a collision having a predetermined threshold level of severity. The threshold level of collision severity is a level at which inflation of the air bag 12 is desired to help protect an occupant of the vehicle seat 26. The switch 44 then closes and electric current is directed through the initiator 28 to actuate the inflator 16.

When the inflator 16 is actuated, it emits the inflation fluid into the diffuser 18. The diffuser 18 directs the inflation fluid into the air bag 12 to inflate the air bag 12. As the inflation fluid beings to inflate the air bag 12, it moves the air bag 12 outward against a cover portion 50 of the vehicle seat 26. The force resulting from the fluid pressure acting on the air bag 12 ruptures the cover portion 50 of the seat 26. As known in the art, the cover portion 50 of the seat 26 may have a tear seam (not shown) so as to rupture in a predetermined configuration. As further known in the art, the module 14 may also include a cover (not shown) for enclosing the air bag 12 and the other parts of the module 14 inside the cover portion 50 of the seat 26. Such a module cover also would be ruptured by the force of the fluid pressure acting on the air bag 12. As the inflation fluid continues to inflate the air bag 12, it moves the air bag 12 outward from the seat 26 and into the vehicle occupant compartment 22.

The air bag 12 is constructed of panels that can be formed of any suitable air bag material, including woven materials and plastic films. The panels of air bag material are interconnected along seams that can be formed by stitches, ultrasonic welds, adhesives, heat-staking, or the like, depending upon the particular material of which the panels are formed. Preferably, the air bag 12 is constructed of panels that are formed of a woven nylon fabric coated with silicone. Such an air bag material is known in the art.

As shown schematically in FIGS. 1 and 2, the air bag 12 has an inflatable body 60 and a inlet portion 62. The inflatable body 60 is unfolded and inflated outward from the seat 26, as shown in FIG. 2. The inlet portion 62 defines a compartment 63 which contains the inflator structure 20, and is retained on the seat 26 with the inflator structure 20. In the preferred embodiment of the present invention, both the inflatable body 60 and the inlet portion 62 of the air bag 12 are constructed from a single, continuous piece 64 (FIG. 4) of air bag material.

The piece 64 of air bag material has an elongated shape with a pair of opposite end edges 66 and 68. The end edges 66 and 68 are both perpendicular to a longitudinal centerline 69 of the piece 64. The piece 64 also has a transverse centerline 71, and includes a pair of panels 72 and 74 on opposite sides of the transverse centerline 71. The first panel 72 extends fully from the transverse centerline 71 to the first end edge 66. The second panel 74 extends fully from the transverse centerline 71 to the second end edge 68. Each of the two panels 72 and 74 is symmetrical about the longitudinal centerline 69.

A body portion 76 of the first panel 72 has a pair of opposite side edges 78 which are alike. An end portion 80 of the first panel 72 extends from the body portion 76 to the first end edge 66, and has a pair of opposite side edges 84 which are alike and which are generally parallel to the longitudinal centerline 69. The side edges 84 define a corresponding pair of opposed tabs 86.

The end portion 80 of the first panel 72 further has a plurality of apertures in rows that are parallel to the transverse centerline 71. These include rows of first, second, third, and fourth apertures 88, 90, 92, and 94. The first apertures 88 are arranged in a row adjacent to the first end edge 66. The second apertures 90 are substantially larger than the other apertures 88, 92 and 94, and are arranged in a row which is centered on the tabs 86. The third and fourth apertures 92 and 94 are alike, and are arranged in rows between the tabs 86 and the body portion 76.

The second panel 74 also has a body portion 100 and an end portion 102. The body portion 100 of the second panel 74 has a pair of opposite side edges 104 which are alike. A pair of fold lines 106 extend partially across the body portion 100, as indicated in dashed lines in FIG. 4, and define the inner boundaries of a corresponding pair of peripheral corner sections 108 of the body portion 100. The end portion 102 of the second panel 74 extends from the body portion 100 to the second end edge 68, and is substantially shorter than the end portion 80 of the first panel 172. The end portion 102 has a pair of opposite side edges 110 which are alike, and has a row of apertures 112 like the row of first apertures 88 at the opposite end of the first panel 72.

Figure 5:
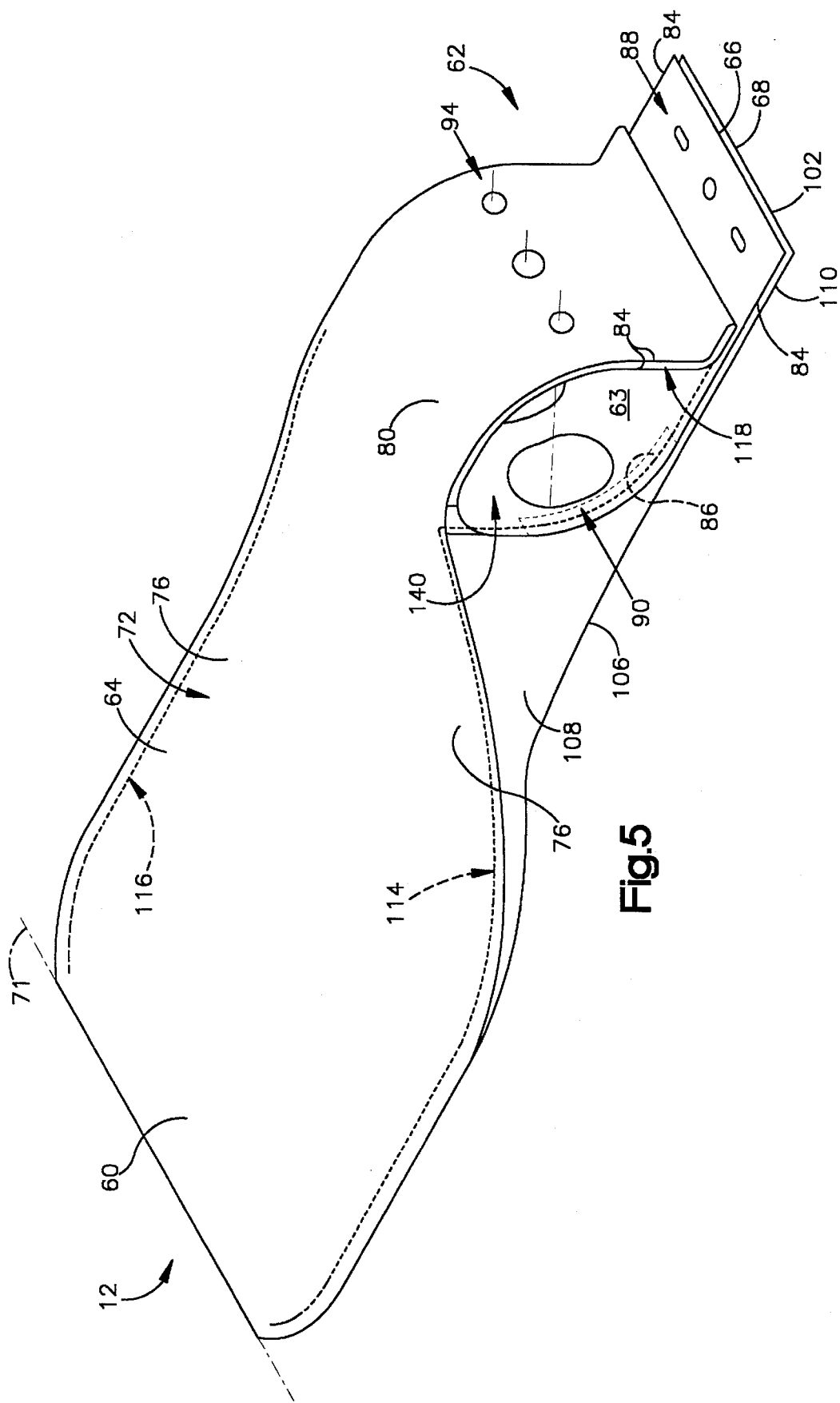
FIG. 5 is a perspective view showing the air bag in a partially constructed condition.

When the air bag 12 is being constructed from the piece 64 of air bag material, the first panel 72 is initially moved pivotally about the transverse centerline 71 in a direction from left to right, as viewed in FIG. 4, so as to place it in a position overlying the second panel 74. The inflatable body 60 (FIG. 5) of the air bag 14 is then formed by fastening the body portions 76 and 100 of the first and second panels 72 and 74 to each other. Specifically, when the piece 64 of air bag material is folded about the transverse centerline 71, the side edges 78 of the body portion 76 are placed against the side edges 104 of the body portion 100. The two body portions 76 and 100 are then fastened to each other at a pair of seams 114 and 116 extending along their adjoining side edges 78 and 104. The seams 114 and 116 also connect the corner sections 108 of the second panel 74 to the tabs 86 on the end portion 80 of the first panel 72. This causes a loop 118 to be formed in the end portion 80 of the first panel 72 between the body portion 76 and the tabs 86. The partially constructed air bag 14 is then turned inside out so that the seams 114 and 116 are concealed within the body 60 of the air bag 14, as indicated in FIG. 5.

The inlet portion 62 of the air bag 12 is formed by fastening the end portions 80 and 102 of the first and second panels 72 and 74 to each other. As best shown in FIG. 6, the end edge 66 of the first panel 72 is placed alongside the end edge 68 of the second panel 74. The apertures 88 near the first end edge 66 are aligned with the apertures 112 near the second end edge 68. A seam 120 (shown schematically) fastens the panels 72 and 74 to each other at a location between the aligned apertures 88 and 112 and the adjacent end edges 66 and 68.

As further shown in FIG. 6, the first apertures 90 in the end portion 80 of the first panel 72 are arranged as inflation fluid outlet openings communicating the compartment 63 with the body 60 of the air bag 12. The loop 118 in the end portion 80 is flattened, and is located so as to extend partially around the compartment 63. The flattened loop 118 then comprises an inner layer 124 of the end portion 80, and further comprises an outer layer 126 which overlaps the inner layer 124. The inner layer 124 includes the third apertures 92. The outer layer 126 includes the fourth apertures 94. The third and fourth apertures 92 and 94 are aligned with each other, and communicate with the compartment 63 at a location opposite the location of the first apertures 90.

An intermediate part 128 of the end portion 80 includes the first apertures 90, extends partially around the compartment 63 between opposite ends of the flattened loop 118. The end portion 80 of the first panel 72, including both the flattened loop 118 and the intermediate part 128, thus has a loop-shaped configuration extending entirely around the compartment 63.

The end portion 80 of the first panel 72 is maintained in its loop-shaped configuration by a set of three seams 130, 132 and 134. The first and second seams 130 and 132 are located on opposite sides of the apertures 90. The third seam 134 closes the compartment 63 at a location between the aligned apertures 92 and 94 and the aligned apertures 88 and 112. The third seam 134 is also located between the tabs 86 and the aligned apertures 88 and 112. In this interconnected configuration, the first and second panels 72 and 74 have respective end sections 136 and 138 extending from the seam 134 to the end edges 66 and 68.

The air bag 14 is foldable from an unwrapped condition, as shown in FIG. 7, to a wrapped condition, as shown in FIG. 8. When the air bag 14 is in the unwrapped condition of FIG. 7, an open end 140 (FIG. 5) of the compartment 63 is large enough for the inflator structure 20, including the mounting studs 32, to be moved longitudinally into the compartment 63 through the open end 140. When the inflator structure 20 has been moved into the compartment 63 in this manner, the mounting studs 32 are inserted through the aligned apertures 92 and 94 in the flattened loop 118, as shown in FIG. 7. The layers 124 and 126 of the flattened loop 118 are then folded and tucked inward between the inflator structure 20 and the end portion 102, as shown in FIG. 8. The end sections 136 and 138 of the two panels 72 and 74 are then moved upward and to the left, as viewed in FIGS. 7 and 8, so that the mounting studs 32 are received through the aligned apertures 88 and 112 adjacent to the end edges 66 and 68. The inlet portion 62 of the air bag 14 is thus wrapped around the inflator structure 20 such that the compartment 63, and the open end 140, are reduced sufficiently in diameter for the inlet portion 62 to retain the inflator structure 20.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

an inflator structure with a mounting stud; and an inflatable vehicle occupant protection device with a panel structure defining a compartment for said inflator structure, said panel structure having a wrapped condition for retaining said inflator structure within said compartment;

said panel structure including a first panel in which a first aperture is formed to communicate with said compartment, said first panel being fixed to a second panel at a seam located between said first aperture and an end of said first panel, said first panel further having a second aperture located between said seam and said end;

said first and second apertures being aligned to receive said mounting stud when said panel structure is in said wrapped condition.

2. Apparatus as defined in claim 1 wherein said inflator structure has a row of mounting studs, said first and second apertures being included in respective rows of apertures which are aligned to receive said mounting studs when said panel structure is in said wrapped condition.

3. Apparatus as defined in claim 1 wherein said second panel has an additional aperture located between said seam and an end of said second panel, said additional aperture being aligned with said first and second apertures to receive said mounting stud when said panel structure is in said wrapped condition.

4. Apparatus as defined in claim 1 wherein said first aperture extends through an outer layer of said first panel which overlaps an inner layer of said first panel, said inner layer having an additional aperture aligned with said first aperture.

5. Apparatus as defined in claim 1 wherein said panel structure comprises a continuous piece of panel material, said piece of panel material having an elongated shape with first and second end edges and a transversely extending fold line located between said first and second end edges, said first panel extending from said fold line to said first end edge, said second panel extending from said fold line to said second end edge.

6. Apparatus as defined in claim 1 wherein said seam is one of a plurality of seams which maintain said panel structure in a loop-shaped configuration defining an open end of said compartment, said panel structure having an unwrapped condition in which said open end has a size which is large enough for said inflator structure to be moved through said open end, said open end having a reduced size which is not large enough for said inflator structure to be moved through said open end when said panel structure is in said wrapped condition.

7. Apparatus as defined in claim 1 wherein said seam is one of a plurality of seams which maintain a portion of said first panel in a loop-shaped configuration extending completely around said compartment.

8. Apparatus as defined in claim 7 wherein said panel structure further defines an inflatable body of said protection device, said portion of said first panel having an inflation fluid outlet opening communicating said compartment with said inflatable body.

9. Apparatus as defined in claim 8 wherein said inflation fluid outlet opening is one of a row of inflation fluid outlet openings in said portion of said first panel.

10. Apparatus as defined in claim 1 wherein said inflator structure comprises an inflator containing a source of inflation fluid and a diffuser containing said inflator, said mounting stud projecting from said diffuser.

11. Apparatus comprising:

an inflator structure with a mounting stud; and an inflatable vehicle occupant protection device with a panel structure defining a compartment for said inflator structure, said panel structure having a wrapped condition for retaining said inflator structure within said compartment;

said panel structure including a first panel in which a first aperture is formed to communicate with said compartment, said first panel being fixed to a second panel at a seam located between said first aperture and an end of said second panel, said second panel having a second aperture located between said seam and said end;

said first and second apertures being aligned to receive said mounting stud when said panel structure is in said wrapped condition.

12. Apparatus as defined in claim 11 wherein said inflator structure has a row of mounting studs, said first and second apertures being included in respective rows of apertures which are aligned to receive said mounting studs when said panel structure is in said wrapped condition.

13. Apparatus as defined in claim 11 wherein said first panel has an additional aperture located between said seam and an end of said first panel, said additional aperture being aligned with said first and second apertures to receive said mounting stud when said panel structure is in said wrapped condition.

14. Apparatus as defined in claim 11 wherein said first aperture extends through an outer layer of said first panel which overlaps an inner layer of said first panel, said inner layer having an additional aperture aligned with said first aperture.

15. Apparatus as defined in claim 11 wherein said panel structure comprises a continuous piece of panel material, said piece of panel material having an elongated shape with first and second end edges and a transversely extending fold line located between said first and second end edges, said first panel extending from said fold line to said first end edge, said second panel extending from said fold line to said second end edge.

16. Apparatus as defined in claim 11 wherein said seam is one of a plurality of seams which maintain said panel structure in a loop-shaped configuration defining an open end of said compartment, said panel structure having an unwrapped condition in which said open end has a size which is large enough for said inflator structure to be moved through said open end, said open end having a reduced size which is not large enough for said inflator structure to be moved through said open end when said panel structure is in said wrapped condition.

17. Apparatus as defined in claim 11 wherein said seam is one of a plurality of seams which maintain a portion of said first panel in a loop-shaped configuration extending completely around said compartment.

18. Apparatus as defined in claim 11 wherein said panel structure further defines an inflatable body of said protection device, said portion of said first panel having an inflation fluid outlet opening communicating said compartment with said inflatable body.

19. Apparatus as defined in claim 11 wherein said inflation fluid outlet opening is one of a row of inflation fluid outlet openings in said portion of said first panel.

20. Apparatus as defined in claim 11 wherein said inflator structure comprises an inflator containing a source of inflation fluid and a diffuser containing said inflator, said mounting stud projecting from said diffuser.

21. Apparatus comprising:

an inflator structure; and an inflatable vehicle occupant protection device having a panel structure including first and second panels, said panel structure comprising a body of said protection device which is inflatable into a vehicle occupant compartment, said panel structure further comprising an inlet portion of said protection device which defines a compartment for said inflator structure;

said protection device having seams which interconnect adjacent portions of said panel structure, said seams maintaining a portion of said first panel in a loop-shaped configuration extending completely around said compartment, said portion of said first panel having an inflation fluid outlet opening communicating said compartment with said body of said protection device.

22. Apparatus as defined in claim 21 wherein said portion of said first panel has a row of inflation fluid outlet openings communicating said compartment with said body of said protection device.

23. Apparatus as defined in claim 21 wherein said panel structure comprises a continuous piece of panel material, said piece of panel material having an elongated shape with first and second end edges and a transversely extending fold line located between said first and second end edges, said first panel extending from said fold line to said first end edge, said second panel extending from said fold line to said second end edge.

24. Apparatus as defined in claim 21 wherein said inflator structure has a mounting stud, an aperture being formed in said portion of said first panel and communicating with said compartment, said loop-shaped configuration being closed by a seam located between said aperture and an end of said first panel, said first panel having another aperture located between said seam and said end, said panel structure having a wrapped condition in which said apertures are aligned to receive said mounting stud.

25. Apparatus as defined in claim 21 wherein said inflator structure has a mounting stud, said panel structure having a wrapped condition in which apertures in said first and second panels are aligned to receive said mounting stud.

26. Apparatus as defined in claim 25 wherein said inflator structure has a row of mounting studs, said apertures being included in rows of apertures which are aligned to receive said mounting studs when said panel structure is in said wrapped condition.

27. Apparatus as defined in claim 25 wherein said inflator structure comprises an inflator containing a source of inflation fluid and a diffuser containing said inflator, said mounting studs projecting from said diffuser.

* * * * *